United States Patent
Leslie et al.

(10) Patent No.: US 8,519,264 B2
(45) Date of Patent: Aug. 27, 2013

(54) SUPER REPELLANT COATED GASKET FOR NETWORK PROTECTOR ENCLOSURE

(75) Inventors: Richard James Leslie, New Baltimore, MI (US); Alaa Abdel-Azim Elmoursi, Troy, MI (US); Stephen William Oneufer, Hope Mills, NC (US)

(73) Assignee: Eaton Corporation, Cleveland, OH (US)

( * ) Notice: Subject to any disclaimer, the term of this patent is extended or adjusted under 35 U.S.C. 154(b) by 48 days.

(21) Appl. No.: 13/296,587

(22) Filed: Nov. 15, 2011

(65) Prior Publication Data

US 2013/0087358 A1 Apr. 11, 2013

Related U.S. Application Data

(63) Continuation-in-part of application No. 13/270,427, filed on Oct. 11, 2011.

(51) Int. Cl.
*H02G 3/08* (2006.01)
*F16J 15/10* (2006.01)

(52) U.S. Cl.
USPC ......... 174/50; 174/17 CT; 174/564; 277/652; 277/650

(58) Field of Classification Search
USPC ............ 174/50, 520, 53, 58, 137 R, 152 G, 174/153 G, 152 R, 17 R, 17 CT, 559, 564, 174/539, 138 R; 220/3.2–3.9, 4.02, 378; 248/906; 439/535; 16/2.1, 2.2; 361/600, 361/601, 607, 616, 724; 52/101; 277/641, 277/642, 644, 590
See application file for complete search history.

(56) References Cited

U.S. PATENT DOCUMENTS

| | | | | | |
|---|---|---|---|---|---|
| 3,923,197 | A | * | 12/1975 | Kuhn | 220/378 |
| 4,017,698 | A | * | 4/1977 | Kuhn et al. | 361/607 |
| 4,223,796 | A | * | 9/1980 | Silver | 220/3.8 |
| 4,298,204 | A | * | 11/1981 | Jinkins | 277/641 |
| 5,864,091 | A | * | 1/1999 | Sumida | 174/50 |
| 6,455,768 | B2 | * | 9/2002 | Negishi | 174/50 |
| 6,657,128 | B2 | | 12/2003 | Ramarge et al. | |
| 6,912,815 | B1 | * | 7/2005 | Koehler et al. | 52/101 |
| 7,208,678 | B2 | * | 4/2007 | Shinmura et al. | 174/50 |
| 7,423,217 | B2 | * | 9/2008 | Pape et al. | 174/50 |
| 7,851,703 | B2 | | 12/2010 | Drane | |
| 8,053,668 | B2 | * | 11/2011 | Lai et al. | 174/50 |
| 2006/0083861 | A1 | | 4/2006 | Gedeon | |

FOREIGN PATENT DOCUMENTS

WO PCT/US2009/005512 A1 4/2010
WO PCT/US2009/059909 A1 4/2010
WO 2012/115986 A1 8/2012

OTHER PUBLICATIONS

Sikka, Vond K. and Jones, Andrew K., White Paper entitled "Highly Durable, Superhydrophobic and Oleophobic Coatings", from Ross Nanetechnology, LLC, PO Box 646. Leola, PA 17540 (10 pgs).

* cited by examiner

*Primary Examiner* — Angel R Estrada
(74) *Attorney, Agent, or Firm* — Eckert Seamans Cherin & Mellott, LLC; Carol A. Marmo

(57) ABSTRACT

A super repellant coated gasket is configured for installation on an enclosure that houses at least one network protector. The coating may be hydrophobic, superhydrophobic, or oleophobic.

20 Claims, 2 Drawing Sheets

SUPER REPELLANT COATED GASKET FOR NETWORK PROTECTOR ENCLOSURE

CROSS REFERENCE TO RELATED APPLICATIONS

This U.S. Continuation-In-Part Application claims the benefit of priority to U.S. Utility application Ser. No. 13/270,427, filed on Oct. 11, 2011 which is incorporated herein by reference in its entirety, for all purposes.

BACKGROUND

Network protectors are used in electricity distribution systems. A network protector automatically connects and disconnects an associated power transformer from a network when power starts flowing in a reverse direction. Typically, the network protector is set to close when the voltage difference and phase angle are such that the transformer will supply power to a secondary grid. Conversely the network protector is set to open when the voltage difference and phasing angle is such that the secondary grid would back-feed through the transformer and supply power to the primary circuit.

Network protectors may be located in a specific NEMA environment, such as underground vaults. Network protectors that are located in underground vaults may be exposed to moisture, sewage, dirt, small animals, and other contaminants. To protect the stability and dependency of the secondary grid, the network protector should be able to withstand a harsh environment. To provide protection against a harsh environment, the network protectors are often housed in enclosures made of corrosion resistant epoxy coated steel or corrosion resistant stainless steel.

SUMMARY

In one embodiment, an elastomeric gasket provided that is configured to be installed between a door and a network protector housing. The gasket includes a super repellant coating.

In one embodiment, an apparatus is provided that includes an enclosure and a super repellant coated gasket. The enclosure is configured to house a network protector and includes a housing having a cutout. The cutout is configured to be covered by an access panel. A coated gasket is placed between the housing and the access panel. The coated gasket is coated with a super repellant coating.

In one embodiment, the coated gasket is secured to the portion of the housing covered by the access panel. In another embodiment, the coated gasket is secured to the portion of the access panel that covers the portion of the housing. The super repellant coating may be a hydrophobic coating, a superhydrophobic coating, and/or an oleophobic coating. The coated gasket may be coated with the coating by at least one of painting, spraying rolling and dipping. The coated gasket may be constructed of at least one of an elastomer or other pliable material.

In one particular embodiment, the access panel is configured with a gasket channel. The gasket channel is configured to receive the coated gasket. The coated gasket has a tubular profile with a hollow center allowing the coated gasket to be compressed. The gasket channel may have an opening that is smaller than the diameter of the coated gasket. To seat the coated gasket in the gasket channel, the coated gasket may be compressed. The coated gasket may be formed to fit the shape of the gasket channel.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1A:
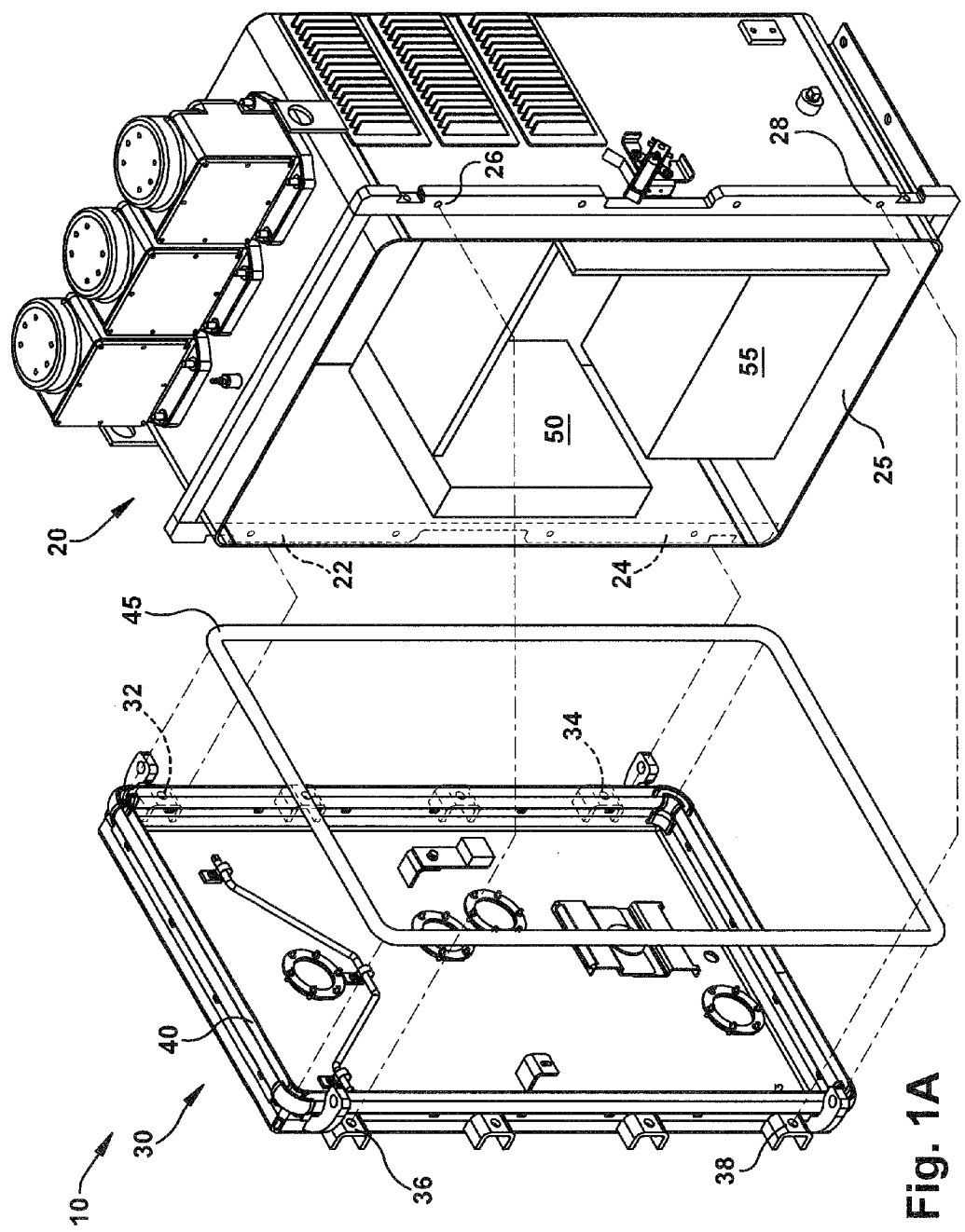
FIG. 1A illustrates an exploded view of an example embodiment of a network protector enclosure with a coated gasket.

A network protector includes three main parts: the housing, the mechanism, and a relay setup. The housing holds the mechanism and the relay setup to prevent damage and tampering with the network protector. The mechanism contains electrical and mechanical parts to switch open and close at least one set of electrical contacts. The relay setup monitors various electrical conditions using sensors, and controls the mechanism through electrical signals. The device uses a power/time curve so that benign back-flows (e.g. elevators) do not trip circuits. IEEE standard C57.12.44 covers network protectors.

Typically, network protectors are contained inside a submersible enclosure which is bolted to the throat of the network transformer and placed in underground vault. The underground vault may be periodically or continually flooded with contaminants (e.g., water, sewage). The flooding has both benefits and drawbacks. For example, where the fluids act as coolant, the flooding may be advantageous for the network protector. Conversely, the flooding may cause fluids to seep into the enclosure, degrading or inhibiting the function of the network protector. Also, operators may need to periodically access the network protector. Therefore, the housings of the enclosures are typically configured with an access panel such as a door. A coated gasket is positioned between the access panel and the housing to seal the enclosure from contaminants.

According to the present invention, a coated gasket used to seal a network protector enclosure is coated with a super repellant coating. The super repellant coating may be super hydrophobic, and/or oleophobic. Super repellant coatings cause liquids, such as water and oil, to bead up on the surface and exhibit a contact angle of at least 150 degrees and a roll-off angle of less than 10 degrees. In creating such a contact angle with the surface, the surface does not wet and is considered to be self-cleaning. This property is known as the Lotus effect.

The Lotus effect refers to the very high water repellency (superhydrophobicity) exhibited by leaves of a lotus flower. Dirt particles are picked up by water droplets due to a complex microscopic and nanoscopic architecture of the surface which minimizes adhesion. Due to their high surface tension, water droplets tend to minimize their surface trying to achieve a spherical shape. On contact with a surface, adhesion forces result in wetting of the surface. Either complete or incomplete wetting may occur depending on the structure of the surface and the fluid tension of the droplet.

The cause of the self-cleaning property is the hydrophobic water-repellent double structure of the surface. This enables the contact area and the adhesion force between surface and droplet to be significantly reduced, resulting in a self-cleaning surface. Thus, dirt particles with an extremely reduced contact area are picked up by water droplets and are thus easily cleaned off the surface. If a water droplet rolls across such a contaminated surface the adhesion between the dirt particle, irrespective of its chemistry, and the droplet is higher than between the particle and the surface.

Super repellant coatings can be applied to a vast array of substrates that include aluminum, steel, PVC, ceramics, plastics, wood, cardboard, and fabrics. Super repellant coatings that are suited for application on network protector enclosure gaskets include Ross Technology Corporation's solvent based I-Coat and water based NuO Coat.

Referring to FIG. 1A, an example embodiment of a network protector enclosure 10 is illustrated. The enclosure 10 includes a housing 20 and a cutout, or front opening, 25 that provides access to the interior of the housing 20. To cover the front opening 25, the housing 20 includes an access panel 30 attached to the housing 20. The access panel 30 is configured to be larger than the front opening 25 of the housing 20. Therefore, the access panel 30 covers the front opening 25 as well as portion of the housing 20.

The access panel 30 may be attached to a face of the housing 20 in a manner that allows the access panel 30 to be removed from the housing 20. For example, the housing may be configured with housing frame components 22, 24, 26, and 28. The housing frame components 22, 24, 26, and 28 may correspond to access panel frame components 32, 34, 36, and 38. The housing frame components 22, 24, 26, and 28 may be configured to be secured to the access panel frame components 32, 34, 36, and 38. The housing frame components 22, 24, 26, and 28 may be secured to the access panel frame components 32, 34, 36, and 38 with fasteners (e.g., nails, screws, bolts, latches).

The access panel 30 may be configured with a gasket channel 40. The gasket channel 40 is configured to receive the coated gasket 45. When the access panel 30 covers the front opening 25, the housing 20 is separated from the access panel 30 and the gasket channel 40 by the coated gasket 45. The coated gasket 45 is compressed between the housing 20 and the gasket channel 40 to form a seal. The coated gasket 45 may be compressed between the housing 20 and the access panel 30 with a compression mechanism (e.g. latch, screw, bolt, and so on).

The coated gasket 45 may be made of a pliable material. The coated gasket 45 may be constructed of an elastomer (e.g., neoprene rubber, polyisoprene, polybutadiene, polyisobutylene, polyurethane). Alternatively, the coated gasket 45 may be constructed of one or a combination of aluminum, steel, ceramics, polymer, wood, glass, and fabrics. The coated gasket 45 may be flexible to allow the coated gasket 45 to form a seal. The coated gasket 45 is coated with a super repellant coating as will be described in more detail below.

An electrical relay setup 50 is placed in the housing 20 to protect the relay setup 50 from contaminants (e.g., fluids, water, sewage). The relay setup 50 may be accessed through the front opening 25 when the housing 20 is open. A mechanism 55 may also be placed in the housing 20 to be protected from the contaminants. While one particular combination of an electrical relay setup 50 and mechanism 55 is illustrated in FIG. 1, any number of combinations of electrical relays, mechanisms, and other devices (e.g., circuit breakers, contacts, sensors, circuits) may be enclosed by the housing 20 that employs a super repellant coated gasket.

Figure 1B:
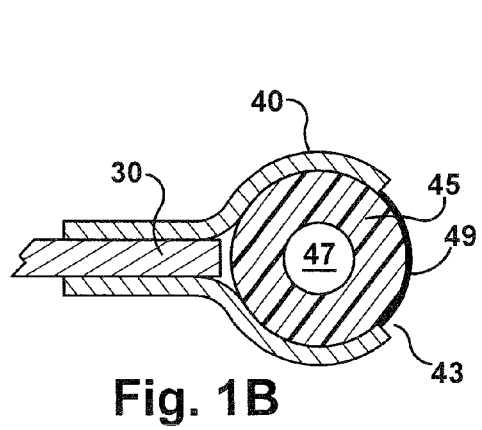
FIG. 1B illustrates a cross sectional view of an example embodiment of a gasket channel associated with a coated gasket.

FIG. 1B illustrates a cross sectional view of an example embodiment of a coated gasket 45 installed in a gasket channel 40 associated with a coated gasket 45. The gasket channel 40 is affixed (e.g., glued, welded, bolted) to the access panel 30. Alternatively, the gasket channel 40 may be formed with the access panel 30 as a single unit. The gasket channel 40 is configured with a gasket channel opening 43 to allow the coated gasket 45 to be seated within the gasket channel 40. One of ordinary skill in the art will recognize that the gasket channel 40 and the gasket channel opening 43 may be any size, and that the sizes of the gasket channel 40 and the gasket channel opening 43 may be based, at least in part, on the diameter of the coated gasket In the illustrated embodiment, the coated gasket 45 has a tubular profile with a hollow center 47. The hollow center 47 allows the coated gasket 45 to be compressed into itself. Thus, the coated gasket 45 can be compressed and seated in the gasket channel 40 even if the gasket channel opening 43 is smaller than the diameter of the coated gasket 45. In an embodiment where the gasket channel opening 43 is smaller than the diameter of the coated gasket 45, the gasket channel 40 will hold the coated gasket 45 in place. The profile of the gasket channel 40 is illustrated as circular to accommodate a tubular coated gasket 45. One of ordinary skill in the art will recognize that the gasket channel 40 and the coated gasket 45 may be any corresponding shapes that allow the coated gasket 45 to be seated within the gasket channel 40.

The coated gasket 45 has a super repellent coating 49. The super repellent coating 49 reduces the likelihood of contaminants (e.g., fluids, water, sewage) from entering the enclosure 10 (shown in FIG. 1A) due to the anti-wicking properties of the super repellant coating 49. The super repellant coating 49 can be hydrophobic, superhydrophobic, or oleophobic. The super repellant coating 49 may be applied to the coated gasket before the gasket 45 is seated in the gasket channel 40. The super repellant coating 49 may be applied to the coated gasket 45 by painting, spraying, rolling, or dipping. Alternatively, the super repellant coating 49 may be applied to the coated gasket 45 after the coated gasket 45 is seated in the gasket channel 40. For example, the super repellant coating 49 may be painted on through the gasket channel opening 43 of the gasket channel 40.

In one embodiment the super repellent coating 49 may be a solvent based coating. In another embodiment, the super repellent coating 49 may be water based coating. Both the solvent based and water based coatings contain nano particles that provide the super repellent properties dispersed in a micron particle binder material. The solvent based coating is formed by applying a top coat of nano particles after the binder micron particles have been applied to the coated gasket 45. This results in a thin layer of nano particles on top of the binder. The water based coating utilizes a polycarbonate and acrylic dispersion system in which the nano particles are evenly dispersed throughout the binder micron particles.

Figure 2A:
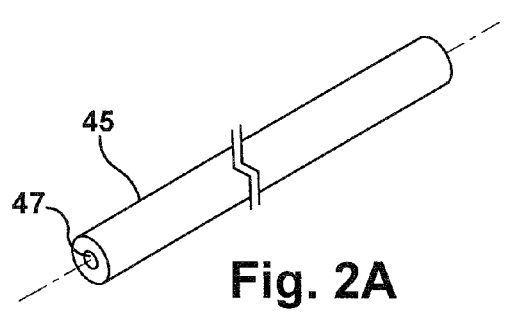
FIG. 2A illustrates a perspective view of an example embodiment of a coated gasket of FIG. 1.

FIG. 2A is a perspective view of an example embodiment of the coated gasket 45. The coated gasket 45 may be a single piece. The coated gasket 45 may have a linear tubular profile with a hollow center 47. The coated gasket 45 may be formed in large quantities (e.g., industrial spool). The coated gasket 45 may be cut to a length needed for a particular application (e.g., to be applied to a network protector enclosure). The tubular construction of the coated gasket 45 allows the coated gasket 45 to be compressed. The ability to be compressed prevents splitting when the coated gasket 45 is manipulated into the gasket channel 40 (shown in FIG. 1B).

Figure 2B:
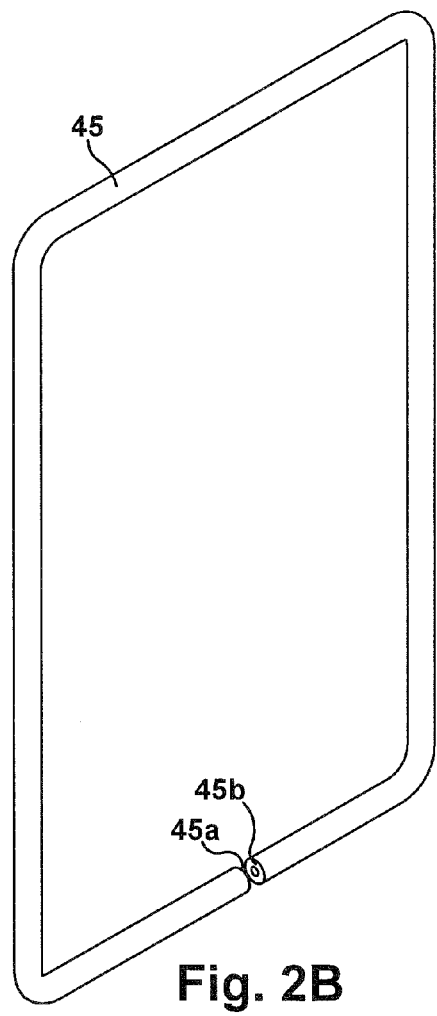
FIG. 2B illustrates a perspective view of an example embodiment of a coated gasket of FIG. 1.

FIG. 2B is an example embodiment of the coated gasket 45. The coated gasket 45 may be of an initially linear shape. The coated gasket 45 may be formed to a particular shape (e.g., rectangular, circular, triangular). The shape of the coated gasket 45 may be formed as a single unit or formed as a composite structure. One of ordinary skill in the art will recognize that the shape of the coated gasket 45 is based, at least in part, on the shape of the enclosure 10, as shown in FIG. 1A, or the manner in which the coated gasket 45 is affixed to the enclosure 10.

The coated gasket 45 may have a first end 45*a* and a second end 45*b* that are affixed together. In one embodiment, the first end 45*a* and the second end 45*b* of the coated gasket 45 may be glued together to form a continuous coated gasket. In another embodiment, the first end 45*a* and the second end 45*b* of the coated gasket 45 may be configured to fit together to form a continuous coated gasket.

Figure 3:
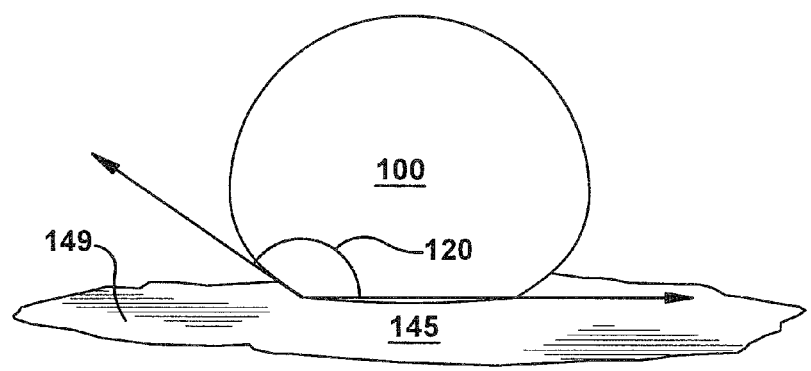
FIG. 3 illustrates a diagram of the contact angle between a droplet of liquid and a coated gasket of FIG. 1.

FIG. 3 illustrates a diagram of the contact angle between a droplet of liquid 110 and a coated gasket 145. A super repellant coating 149 is layered on the coated gasket 145. The super repellent coating 149 may be hydrophobic, superhydrophobic, or oleophobic. The super repellent coating 149 is designed to repel liquid, such as water or oil. Accordingly, the droplet of liquid 110 beads up on the surface of the coated gasket 145. By beading up, the contact angle 120 between the coated gasket 145 and the droplet of liquid 110 is increased. For example, a droplet of liquid 110 may exhibit a contact angle 120 of 150° or greater with the coated gasket 145 and have a roll-off angle of less than 10°. The greater the contact angle 120 between the coated gasket 145 and the droplet of liquid 110, the more likely the droplet of liquid 110 is to roll off the coated gasket 145.

Due to the abusive conditions in underground vaults that network protectors are exposed to and the pliable structure of the gasket, the coatings for the gasket should be resistant to abrasion so that it is not washed away during extended use. Both solvent based (e.g., I Coat) and water based (e.g., NuO Coat) super repellant coatings initially provide a contact angle of greater than 150 degrees. In testing, a first set of gaskets were coated with the water based coating and a second set of gaskets were coated with the solvent based coating. Both sets of gaskets were then soaked for 13 hours in a cleaner concentration mixed with one part cleaner to one hundred parts water. There was no loss of surface functionality observed through the 13 hours of soaking for either the gaskets with water based coating or the gaskets with solvent based coating.

A number of tests were also run to determine whether a water based coating would be more abrasion resistant than a solvent based coating. It was hypothesized that the solvent based coating would outperform the water based coating because the water based coating would wear more than the solvent based coating. While the water based coating did exhibit more loss of material in abrasion testing, the water based coating better maintained its water repelling properties on metal substrates as well as exhibiting higher tensile strength than the solvent base coating when coating rubber substrates. This may be because the super repellant nano particles in the water based coating are dispersed below the surface while only the very top layer of the solvent based coating contains nano particles.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus comprising:
    an enclosure configured to house a network protector, which comprises:
        a housing having a cutout;
        an access panel configured to cover the cutout;
        a gasket channel affixed to one of the housing and the access panel; and
        a gasket seated in the gasket channel, the gasket having a surface and the surface having at least partially deposited thereon a coating, the coating being effective to repel wetting of the surface of the gasket upon contact with a liquid material.

2. The apparatus of claim 1, where the gasket is a tubular gasket with a hollow profile, having an interior surface and an exterior surface and wherein the coating coats at least a portion of the exterior surface.

3. The apparatus of claim 1, where the coating is a hydrophobic coating.

4. The apparatus of claim 1, where the coating is a superhydrophobic coating.

5. The apparatus of claim 1, where the coating is an oleophobic coating.

6. The apparatus of claim 1, where the gasket is constructed of a material selected from the group consisting of neoprene rubber, polyisoprene, polybutadiene, polyisobutylene, polyurethane and mixtures thereof.

7. The apparatus of claim 1, where the gasket channel is circular having a gasket channel opening, and where the gasket channel opening is smaller than a diameter of the gasket.

8. The apparatus of claim 1, where the coating comprises:
    a material selected from the group consisting of solvent and water;
    nanoparticles; and
    a micron particle binder.

9. An apparatus comprising:
    a housing;
    an access panel connected to the housing;
    a gasket channel affixed to one of the housing and the access panel;
    an elastomeric gasket installed in the gasket channel; and
    a coating that coats at least a portion of a surface of the elastomeric gasket, the coating being effective to repel wetting of the surface of the elastomeric gasket upon contact with a liquid material.

10. The apparatus of claim 9, where the gasket channel is configured to be attached to the access panel to allow the elastomeric gasket to form boundary between the access panel and the housing.

11. The apparatus of claim 9, where the gasket channel is circular having a gasket channel opening, and where the gasket channel opening is smaller than a diameter of the elastomeric gasket.

12. The apparatus of claim 9, where the elastomeric gasket has a tubular profile with a hollow center, having an interior surface and an exterior surface, and wherein the coating coats at least a portion of the exterior surface.

13. The apparatus of claim 9, where the coating is a hydrophobic coating.

14. The apparatus of claim 9, where the coating is a superhydrophobic coating.

15. The apparatus of claim 9, where the coating is an oleophobic coating.

16. The apparatus of claim 9, where the elastomeric gasket is configured to be coated with the coating when the elastomeric gasket is seated in the gasket channel.

17. The apparatus of claim 9, where the elastomeric gasket is constructed of a material selected from the group consisting of neoprene rubber, polyisoprene, polybutadiene, polyisobutylene, polyurethane and mixtures thereof.

18. The apparatus of claim 9, where the elastomeric gasket is a composite structure.

19. The apparatus of claim 18, where the composite structure is formed by a plurality of elastomeric gasket pieces.

20. The apparatus of claim 9, where the coating comprises:
a material selected from the group consisting of solvent and water;
nanoparticles; and
a micron particle binder.

* * * * *